3,303,093
EMBONIC ACID SALT OF SPIRAMYCIN
Charles Romeo Marcel Schuppon, Nanterre, France, assignor to Rhone-Poulenc S.A., Paris, France, a corporation of France
No Drawing. Filed Mar. 12, 1962, Ser. No. 179,228
Claims priority, application France, Mar. 16, 1961, 855,834
1 Claim. (Cl. 167—65)

This invention relates to a new salt of spiramycin antibiotics, to a process for their preparation and animal foodstuffs containing them.

The unqualified term "spiramycin" as used herein and in the appended claim means Spiramycin I, II or III and mixtures of at least two of Spiramycins I, II and III. Such products are described in British Patent No. 758,726.

According to the present invention, there are provided the hitherto unknown embonic acid (i.e. 2,2'-dihydroxy-1,1'-dinaphthylmethane-3,3'-dicarboxylic acid) salts of spiramycin.

The aforesaid new salts, viz. spiramycin embonates, may be prepared by the application of known processes for the conversion of organic bases into salts. According to a feature of the present invention, the spiramycin embonates are prepared by a double decomposition reaction in equeous solution between a water-soluble salt (preferably an alkali metal salt) of embonic acid and a water-soluble spiramycin salt, such as spiramycin sulphate or phosphate.

The embonates formed, consisting of one molecule of embonic acid and one molecule of spiramycin, are water-insoluble compounds which possess anabolising properties similar to those of the spiramycin bases. When added to the food of animals, the spiramycin embonates of the present invention cause much more rapid increase in weight of the animal than that caused with entirely natural foods. Moreover, the spiramycin embonates possess the advantages in comparison with spiramycin bases of being particularly stable during storage and of being able to be mixed with all substances normally given in the feeding of domestic animals without alteration during storage.

The various spiramycin embonates all show this favourable effect on the growth of animals to the same degree. For this reason it is satisfactory to use in practice for anabolising purposes embonates obtained from mixtures of Spiramycins I, II and III such as are formed during the fermentation process described and claimed in British Patent No. 758,726.

A further feature of the invention consists of animal foodstuffs and nutritional concentrates, more especially in a form for use in feeding pigs and fowl, containing an embonic acid salt of spiramycin. The quantity of spiramycin embonate added to the foodstuff in order to cause an anabolic effect may naturally vary within fairly wide limits according to the species of animal and according to the value of the foodstuffs themselves. As a general rule, it is sufficient that the foodstuffs actually given to the animals should contain 5 to 50 grams of spiramycin embonate per metric ton of foodstuff.

The spiramycin embonates of the present invention are suitable for administration to all domestic animals, but more especially to weaned piglets and chickens.

The following example illustrates the invention.

*Example*

An aqueous solution (4 litres) of sodium embonate (containing 1 mole of the salt) is poured all at once with an aqueous solution (4 litres) of spiramycin sulphate prepared from a mixture of Spiramycin I, II and III bases (containing 1 mole of spiramycin base) into a vessel fitted with a stirrer. The precipitate which forms is then separated, washed and dried giving spiramycin embonate (1066 grams) in the form of a greenish-yellow powder.

This salt of spiramycin has been tested in the nutrition of pigs receiving a diet of the following composition:

| | Percent |
|---|---|
| Maize flour | 76 |
| Soya flour | 17 |
| Meat meal | 2 |
| Fish meal | 1 |
| Lucerne meal | 2 |
| Chalk, calcium phosphate, sodium chloride | 2 |

Three homogenous groups each containing 10 pigs, taken after weaning, each receive the same basic diet. To the food of the second and third groups, however, there was added the spiramycin embonate obtained in the foregoing example at rates of 15 grams/metric ton and 22 grams/metric ton respectively. The mean weight gains recorded are given below:

| | Control Group | Second Group | Third Group |
|---|---|---|---|
| Mean daily grain (in grams per animal) | 584 | 688 | 670 |
| Increase in rate of growth compared with control: $100(Gi-Gl)/Gl$, percent | | +17.8 | +14.7 |

Gl represents the mean daily gain of the control group and Gi the mean gain of the second and third groups.

A stability test carried out on a sample of the above food containing spiramycin embonate shows that this salt is very stable. After three months storage at ambient temperature (20–22° C.), 95% of the initial embonate is recoverable.

I claim:
Embonic acid salt of spiramycin.

References Cited by the Examiner

UNITED STATES PATENTS

| 2,908,611 | 10/1959 | Dutche et al. | 167—65 |
| 2,925,417 | 2/1960 | Elslager | 167—55 X |
| 3,011,947 | 12/1961 | Preud'homme et al. | 167—65 |
| 3,023,105 | 2/1962 | Upham et al. | 99—2 |
| 3,039,874 | 6/1962 | Schuppon | 99—2 |
| 3,067,242 | 12/1962 | Larrabee | 167—55 X |

FOREIGN PATENTS 864,786    4/1961    Great Britain.

OTHER REFERENCES

Merck Index, 1960, Merck and Co., Rahway, New Jersey, p. 972.

JULIAN S. LEVITT, *Primary Examiner.*

A. LOUIS MONACELL, *Examiner.*

SAM ROSEN, *Assistant Examiner.*